US012058296B2

(12) United States Patent
Weems, III

(10) Patent No.: US 12,058,296 B2
(45) Date of Patent: *Aug. 6, 2024

(54) CONTENT MANAGEMENT FOR VIRTUAL TOURS

(71) Applicant: VIRTUALLY ANYWHERE INTERACTIVE, LLC, Austin, TX (US)

(72) Inventor: Fontaine Carrington Weems, III, Austin, TX (US)

(73) Assignee: Virtually Anywhere Interactive, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/146,118

(22) Filed: Jan. 11, 2021

(65) Prior Publication Data

US 2021/0136247 A1     May 6, 2021

Related U.S. Application Data

(63) Continuation of application No. 13/731,918, filed on Dec. 31, 2012, now Pat. No. 10,924,627.

(51) Int. Cl.
*H04N 1/32*     (2006.01)
*G06F 3/01*     (2006.01)
*G06F 3/04815*     (2022.01)
*G06F 3/04845*     (2022.01)
(Continued)

(52) U.S. Cl.
CPC ......... *H04N 1/32112* (2013.01); *G06F 3/011* (2013.01); *G06F 3/04815* (2013.01); *G06F 3/04845* (2013.01); *G06T 19/003* (2013.01); *G06Q 50/16* (2013.01); *H04N 2201/3249* (2013.01); *H04N 2201/3261* (2013.01); *H04N 2201/3273* (2013.01)

(58) Field of Classification Search
CPC ....... H04N 1/32112; H04N 2201/3261; H04N 2201/3249; H04N 2201/3273; G06F 3/04815; G06F 3/011; G06F 3/04845; G06T 19/003; G06Q 50/16
USPC ......................................................... 715/205
See application file for complete search history.

(56) References Cited

U.S. PATENT DOCUMENTS 6,317,885 B1 * 11/2001 Fries ................. H04N 21/4345
                                                                    725/109
6,388,688 B1 * 5/2002 Schileru-Key ...... G06F 3/04815
                                                                    715/854

(Continued)

OTHER PUBLICATIONS

Easypano, Tourweaver 4.00 User Manual; Oct. 9, 2011; EasyPano.com; pp. 1-110.*

(Continued)

*Primary Examiner* — Maikhanh Nguyen

(57) ABSTRACT

Content management for virtual tours including exposing, within a virtual tour, a hotspot, the hotspot having an associated a hyperlink to a third-party content management provider and access code for accessing content from third-party content management provider; receiving an invocation of the hotspot; invoking the hyperlink associated with the hotspot; invoking the access code for accessing content from third-party content management provider; receiving, from the third-party content management provider, content; and displaying the received content within the virtual tour.

19 Claims, 4 Drawing Sheets

(51) Int. Cl.
*G06T 19/00* (2011.01)
*G06Q 50/16* (2012.01)

(56) References Cited

U.S. PATENT DOCUMENTS

| | | | | |
|---|---|---|---|---|
| 6,563,529 | B1* | 5/2003 | Jongerius | G06F 3/04815 345/629 |
| 6,578,008 | B1* | 6/2003 | Chacker | G06Q 30/02 705/7.32 |
| 6,580,441 | B2* | 6/2003 | Schileru-Key | G06F 3/04815 705/27.1 |
| 6,754,400 | B2 | 6/2004 | Florin et al. | |
| 6,839,880 | B1* | 1/2005 | Morse | G06Q 50/16 715/202 |
| 7,096,428 | B2* | 8/2006 | Foote | G06F 3/04815 707/E17.018 |
| 7,187,377 | B1* | 3/2007 | Pella | G06T 15/40 345/419 |
| 7,216,297 | B1* | 5/2007 | Douglis | G06F 9/451 715/810 |
| 7,334,190 | B2* | 2/2008 | Wierowski | G06F 3/0482 715/712 |
| 7,567,274 | B2* | 7/2009 | Ekpar | G06T 3/0062 348/211.9 |
| 7,746,376 | B2* | 6/2010 | Mendoza | G06F 16/9537 348/39 |
| 7,933,395 | B1* | 4/2011 | Bailly | G06F 3/04815 379/201.04 |
| 8,042,064 | B2* | 10/2011 | Cardu | G06F 16/954 715/850 |
| 8,493,408 | B2* | 7/2013 | Williamson | G06T 15/20 345/173 |
| 8,612,512 | B1* | 12/2013 | Croak | H04L 65/1089 709/203 |
| 8,624,958 | B2* | 1/2014 | Mendoza | G06F 16/9537 |
| 10,151,599 | B1* | 12/2018 | Meador | G06Q 30/13 |
| 2001/0025261 | A1* | 9/2001 | Olefson | H04L 29/06 705/313 |
| 2002/0035728 | A1* | 3/2002 | Fries | H04N 21/2355 725/68 |
| 2002/0116297 | A1* | 8/2002 | Olefson | G06Q 30/0641 705/14.14 |
| 2002/0140829 | A1 | 10/2002 | Colavin et al. | |
| 2002/0152236 | A1* | 10/2002 | Incertis-Carro | G06F 16/9558 715/205 |
| 2003/0003957 | A1 | 1/2003 | Berkema et al. | |
| 2003/0090487 | A1* | 5/2003 | Dawson-Scully | G06T 15/205 345/473 |
| 2004/0169724 | A1* | 9/2004 | Ekpar | G06T 3/0062 348/36 |
| 2004/0183826 | A1* | 9/2004 | Taylor | G06T 19/003 715/738 |
| 2005/0273458 | A1* | 12/2005 | Adams | G06Q 30/02 |
| 2006/0015925 | A1* | 1/2006 | Logan | H04N 7/163 725/135 |
| 2006/0020522 | A1* | 1/2006 | Pratt | G06Q 30/0643 705/27.2 |
| 2006/0114516 | A1* | 6/2006 | Rothschild | H04N 1/2187 358/3.28 |
| 2006/0139375 | A1 | 6/2006 | Rasmussen et al. | |
| 2006/0253781 | A1* | 11/2006 | Pea | G11B 27/105 715/723 |
| 2007/0047008 | A1* | 3/2007 | Graham | G06K 9/325 358/401 |
| 2007/0229396 | A1* | 10/2007 | Rajasingham | G06F 3/013 345/8 |
| 2007/0273758 | A1* | 11/2007 | Mendoza | G06F 3/04815 348/39 |
| 2008/0033641 | A1* | 2/2008 | Medalia | G06F 3/04815 701/533 |
| 2008/0126206 | A1* | 5/2008 | Jarrell | G06Q 30/0239 705/14.23 |
| 2008/0222538 | A1 | 9/2008 | Cardu | |
| 2008/0281754 | A1* | 11/2008 | Kelley | G06Q 30/02 705/39 |
| 2008/0291279 | A1 | 11/2008 | Samarasekera et al. | |
| 2009/0031246 | A1* | 1/2009 | Cowtan | G06Q 30/00 715/786 |
| 2009/0135178 | A1* | 5/2009 | Aihara | G06T 15/205 348/207.1 |
| 2009/0325607 | A1* | 12/2009 | Conway | G06F 1/1694 455/456.3 |
| 2010/0312670 | A1* | 12/2010 | Dempsey | G06Q 30/0643 705/27.2 |
| 2011/0105192 | A1* | 5/2011 | Jung | G06F 3/04845 345/173 |
| 2011/0196897 | A1* | 8/2011 | Koch | G01C 21/00 707/792 |
| 2011/0211040 | A1* | 9/2011 | Lindemann | G01S 19/49 348/36 |
| 2011/0213549 | A1* | 9/2011 | Hallas | G01C 21/20 701/533 |
| 2011/0221656 | A1* | 9/2011 | Haddick | G06Q 30/02 345/8 |
| 2011/0258528 | A1* | 10/2011 | Roper | G06F 40/143 715/234 |
| 2011/0279453 | A1* | 11/2011 | Murphy | G06T 5/002 345/420 |
| 2011/0283223 | A1* | 11/2011 | Vaittinen | G06F 3/04815 715/781 |
| 2012/0033032 | A1* | 2/2012 | Kankainen | H04N 5/23216 348/E7.001 |
| 2012/0059720 | A1* | 3/2012 | Musabji | G01C 21/3647 701/527 |
| 2012/0099804 | A1* | 4/2012 | Aguilera | G06T 19/003 382/285 |
| 2012/0124471 | A1* | 5/2012 | Gusky | G06T 19/003 715/705 |
| 2012/0194419 | A1* | 8/2012 | Osterhout | G02B 27/017 345/156 |
| 2012/0231814 | A1* | 9/2012 | Calman | G06Q 50/16 455/456.3 |
| 2012/0240077 | A1 | 9/2012 | Vaittinen et al. | |
| 2012/0249586 | A1* | 10/2012 | Wither | H04N 1/00323 345/633 |
| 2012/0260232 | A1* | 10/2012 | Hirsch | G06F 8/36 717/107 |
| 2013/0073983 | A1 | 3/2013 | Rasmussen et al. | |
| 2013/0091214 | A1* | 4/2013 | Kellerman | G06Q 10/00 709/204 |
| 2013/0135479 | A1* | 5/2013 | Bregman-Amitai | G11B 27/034 348/158 |
| 2013/0191359 | A1* | 7/2013 | Meadow | G06F 40/10 707/705 |
| 2013/0191787 | A1* | 7/2013 | Armstrong | G06F 1/1694 715/850 |
| 2013/0204712 | A1* | 8/2013 | Armstrong | G06Q 30/0273 705/14.69 |
| 2013/0335446 | A1* | 12/2013 | Piippo | G06F 3/04883 715/788 |
| 2014/0063055 | A1* | 3/2014 | Osterhout | G06F 3/165 345/633 |

OTHER PUBLICATIONS

Don Kimber et al.; "FlyAbout: Spatially Indexed panoramic Video;" Sep. 30, 2001; ACM Multimedia conference; pp. 1-9.*
A. Barth; HTTP State Management Mechanism Request for Comments: 6265; Apr. 2011; Internet Engineering Task Force (IETF); pp. 1-37.*

* cited by examiner

CONTENT MANAGEMENT FOR VIRTUAL TOURS

CROSS-REFERENCE TO RELATED APPLICATION

This application is a continuation of U.S. patent application Ser. No. 13/731,918, filed Dec. 30, 2012.

BACKGROUND OF THE INVENTION

Field of the Invention

The field of the invention is data processing, or, more specifically, content management for virtual tours.

Description of Related Art

A virtual tour is a simulation of an existing location, usually composed of a sequence of images. Virtual tours also may use other multimedia elements such as sound effects, music, narration, and text. The phrase "virtual tour" is often used to describe a variety of video and photographic-based media. Panorama indicates an unbroken view, since a panorama can be either a series of photographs or panning video footage. However, the phrases "panoramic tour" and "virtual tour" have mostly been associated with virtual tours created using still cameras. Such virtual tours are made up of a number of shots taken from a single vantage point.

Virtual tours often have hotspots embedded into them to access additional images or other content describing a feature in the virtual tour indicated by the hotspot. The content accessible by invoking the hotspots is currently stored with the virtual tour. This makes updating a virtual tour difficult and expensive because the virtual tour creator must update the content of the hotspot or provide a specific content management tool unique to the particular virtual tour to allow a virtual tour owner to update the content associated with the hotspot. In either case, such hotspots are burdensome and expensive to keep current and flexible.

SUMMARY OF THE INVENTION

Content management for virtual tours including exposing, within a virtual tour, a hotspot, the hotspot having an associated a hyperlink to a third-party content management provider and access code for accessing content from third-party content management provider; receiving an invocation of the hotspot; invoking the hyperlink associated with the hotspot; invoking the access code for accessing content from third-party content management provider; receiving, from the third-party content management provider, content; and displaying the received content within the virtual tour.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
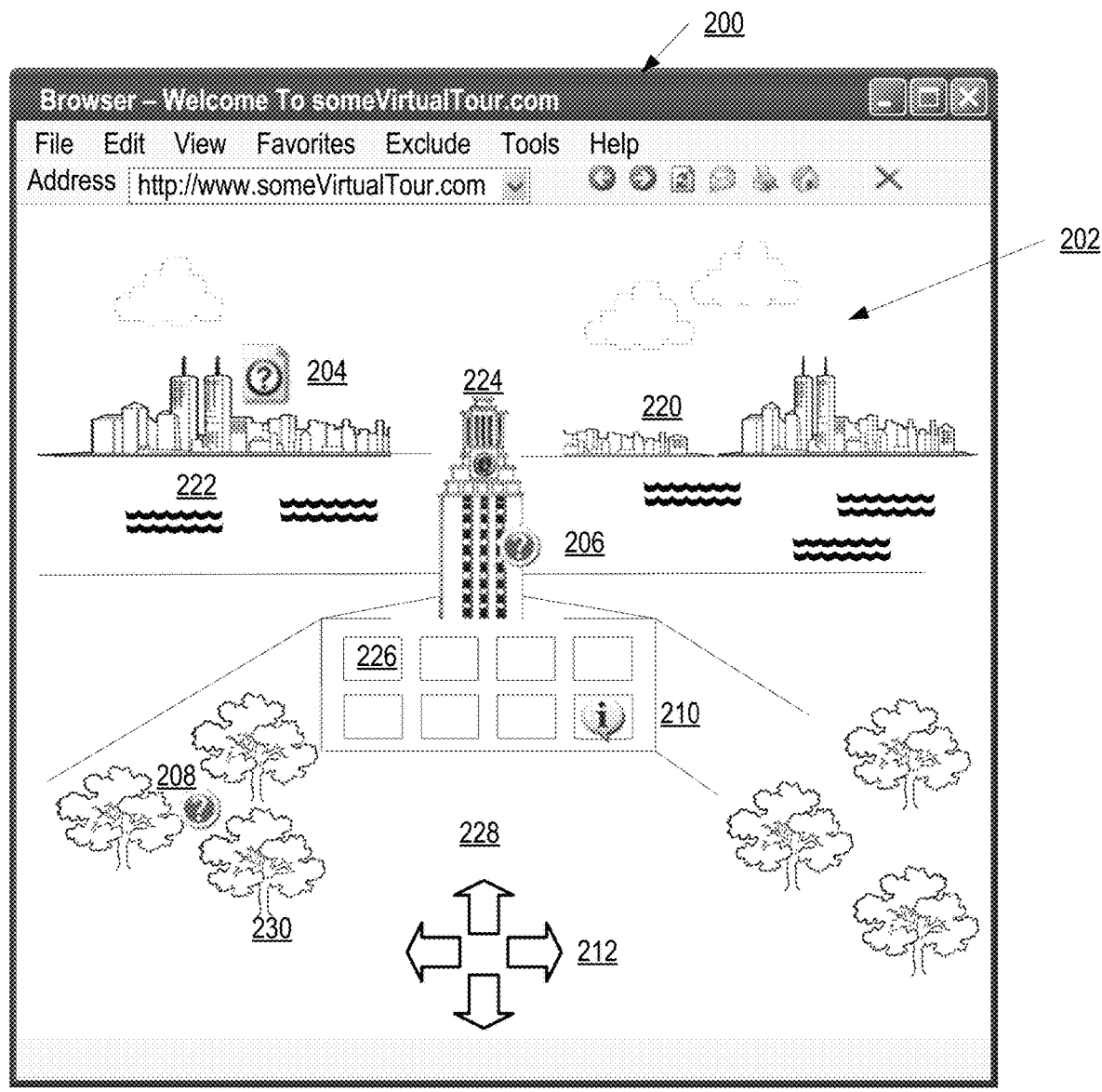
FIG. 1 sets forth a line drawing of a virtual tour according to embodiments of the present invention.

Example methods, systems, and products for content management for virtual tours and virtual tours in accordance with the present invention are described with reference to the accompanying drawings, beginning with FIG. 1. FIG. 1 sets forth a line drawing of a virtual tour according to embodiments of the present invention. The virtual tour (202) in the example of FIG. 1 is displayed in a web browser (200), although in alternative embodiments virtual tours may be displayed in other applications such as mobile applications, special purpose applications, and the like. The virtual tour (202) of FIG. 1 includes a rotatable image of a location to be toured. In this example the virtual tour includes a rotatable image of a college campus having a tower (224), buildings (226), a courtyard (228) with trees (230). The current view of the college campus is set before a city skyline (220) and river (222). The image is rotatable in the example of FIG. 1 through use of graphical user interface ("GUI") controls (212) that allow the image to be rotated both horizontally and vertically to provide a 360 degree view of the campus from the courtyard (228). In some embodiments of the present invention the virtual tour is rotatable through the use of mouseover actions that allow the image to rotate without displaying the GUI controls.

The virtual tour (202) of FIG. 1 is a simulation of an existing location, composed of a sequence of still photo images. Virtual tours such as the one of FIG. 1 is typically are made up of a number of images taken from a single vantage point and stitched together. The camera and lens are typically rotated around what is referred to as a nodal point (the exact point inside the lens where the light converges).

There are a number of popular ways of "stitching" the images of virtual tours together. One way of stitching images together to create a virtual tour is called rectilinear stitching. This involves the rotation of a digital camera, typically in the portrait (up and down) position and centered directly over a tripod. As the operator manually rotates the camera, the camera stops or clicks into a detent such as every 30°. The rotator can be adjusted by changing the position of "detent ring or bolt," into another slot like; 40°, 60°, 90° etc.

If the camera lens supports a wider view, operators may a detent a wider view such as for example 60°, which means only 6 shots are needed as opposed to 10 shots to capture the same panoramic view. The combination of a precision rotator and a digital camera allows the photographer to take rectangular "slices" of any scene. With a typical point and shoot digital camera, the operator may take 8, 10, 12 or 14 slices of a scene. Using specialized "photo stitching" software such as PT GUI, Autopano or some other program the operator then assembles the "slices" into a rectangular one—typically 4,500 pixels to 6,000 pixels wide. This technique, while often time consuming, has remained popular as the required equipment, rotator heads and software are relatively inexpensive to buy and are easy to learn. This type of stitched panoramic view is also called "cylindrical"—as the resulting stitched panorama allows panning in a complete 360° but offers a limited look up or down of about 50° degrees above or below the horizon line.

Another way of stitching images together to create a virtual tour is called spherical stitching. This method requires the use of a "fish eye" lens equipped digital SLR camera. The 2-shot fish eye camera system has a two-shot rotator head that rotates and locks into 0° and 180° positions only. The lenses used are fish eye lenses. This system enables photographers to capture a full 360×360 floor to ceiling view of any scene with just 4 shots as opposed to the more time consuming 8, 10, or 12-shot rectilinear produced panoramas as described above. This type of virtual tour requires more expensive virtual tour camera equipment including (for example) a Sigma 8 mm f/3.5 lens which allows photographers to set their rotator heads to 90° and capture a complete virtual tour of any scene in just 4 shots (0°, 90°, 180°, 270°).

Another way of stitching images together to create a virtual tour is called cubical stitching. This technique was one of the first forms of immersive, floor to ceiling virtual tours and Apple Computer pioneered this with the release of Apple's QuickTime VR. Free utility software such as Cubic Converter and others allow photographers to stitch and convert their panoramas into a "cube" like box to achieve a complete 360×360 view.

While programs such as Adobe Photoshop have new features that allow users to stitch images together, they only support "rectilinear," types of stitching and Photoshop cannot produce them as fast or as accurate as stitching software programs can such as Autodesk Stitcher. This is because there is sophisticated math and camera-lens profiles that are needed to create the desired panorama image which is based on a particular camera's depth of field (FOV) and the type of lens used. Camera's such as the Nikon D3 or D700 have a full frame digital SLR cameras, whereas the Nikon D90 or Canon T2i (Rebel line of Digital EOS cameras) have a smaller sensor. When full frame digital SLR cameras are used with a fish eye lens such as a Sigma 8 mm F/3.5, you will see a full circular image. This allows an operator to shoot 2 or 3 shots per view to create a 360×360 stitched panoramic image. When used with a non full frame digital SLR camera like the Nikon D90 or Canon digital Rebel and similar cameras, typically 4-shots are required and the camera is in the portrait position.

The virtual tour (202) of FIG. 1 includes a number of in-context hotspots (204, 206, 208, and 210). Each of the hotspots (204, 206, 208, and 210) are 'in-context' in that each of the hotspots have an icon located on a point of interest in the virtual tour (202) and have associated content related to the particular point of interest. That is, the location of the in-context hotspot (204, 206, 208, and 210) in the virtual tour (202) indicates a relationship between one or more visual elements of the virtual tour (202) and content available from the third-party content management provider for display in the virtual tour.

Each of the hotspots (204, 206, 208, and 210) have an associated hyperlink to a third-party content management provider and access code for accessing content from third-party content management provider. A third-party content management provider is a publicly available content management operator, typically, operating through a publicly available website. Examples of third party content management providers include YouTube.com, Twitter.com, Flickr.com, Facebook.com, and others as will occur to those of skill in the art. The third-party content management providers are 'third party' in that they are neither the virtual tour maker or photographer or the virtual tour owner or operator.

Typically, the owner of the virtual tour has an account with the third-party content management provider allowing that owner to update content for the hotspot without having to involve the maker of the virtual tour.

In the example of FIG. 1, a hotspot (208) has an associated hyperlink to a YouTube video and access code for accessing a video about the trees (230) in the courtyard (228) from YouTube. The example hotspot (210) has an associated hyperlink to a Twitter feed and access code for accessing a Twitter feed about jobs available in the building (226) of the college campus which is the subject of the virtual tour. The example hotspot (206) has an associated hyperlink to a YouTube video and access code for accessing a video from YouTube about the history of the tower (224). The example hotspot (204) has an associated hyperlink to a Facebook profile and access code for accessing the Facebook profile about the city (220) in the background of the campus which is the subject of the virtual tour.

Figure 2:
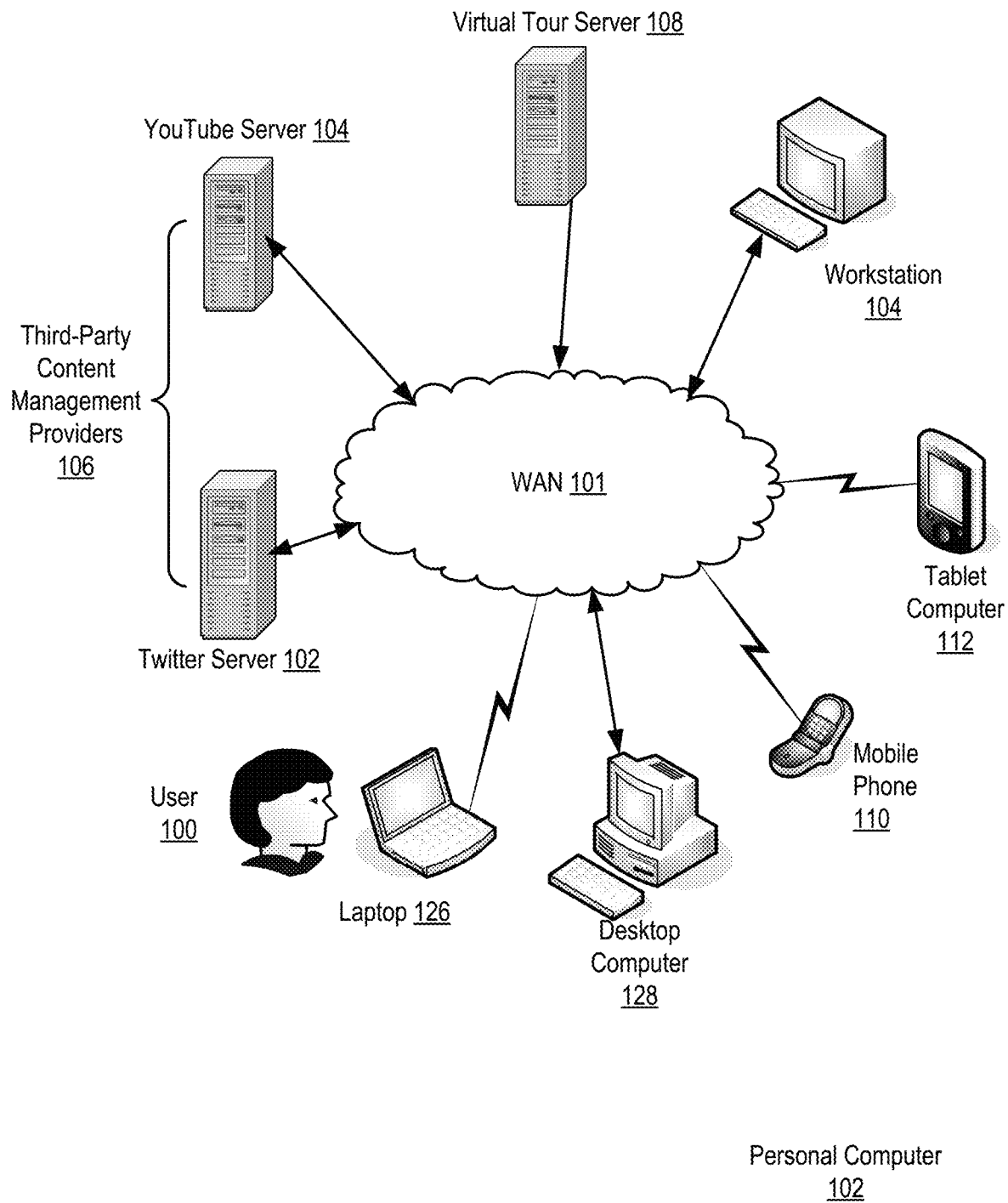
FIG. 2 sets forth a block diagram of a system for content management for virtual tours.

For further explanation, FIG. 2 sets forth a block diagram of a system for content management for virtual tours. The system of FIG. 2 includes a number of client devices for viewing virtual tours. The system of FIG. 2 includes a laptop (126), a desktop computer (128), a mobile phone (110), a tablet computer (112), and a workstation (104) coupled for data communications to a wide area network ('WAN'). Each of these client devices (126, 128, 110, 112, 104) allows a user (100) to view a virtual tour provided by the virtual tour server (108) also coupled for data communications with the WAN.

The system of FIG. 2 also includes two third party content management providers (106), a YouTube server (104) and a Twitter server (102). The YouTube server serves content for YouTube.com and the Twitter server serves content for Twitter.com.

The virtual tour server (108) provides a virtual tour to be viewed on one of the client devices and exposes, within the virtual tour, a hotspot. The hotspot so exposed has an associated a hyperlink to a third-party content management provider (106) and access code for accessing content from third-party content management provider. Such access code is typically provided by the third-party content provider available for download through a website associated with the third-party content provider.

A user viewing the virtual tour on one of the client devices (126, 128, 110, 112, 104) in the example of FIG. 2 may invoke a hotpot which in turns invokes the hyperlink associated with the hotspot and invokes the access code for accessing content from third-party content management provider (106). In the system of FIG. 2 the content associated with the hotspot is received directly from the third-party content management provider (106) and displayed within the virtual tour without requiring immediate intervention by the virtual tour server (108).

In the example of FIG. 2, a user may view a virtual tour with a hotspot that when invoked requests through a hyperlink and specific access code YouTube content from the YouTube server (104). Such YouTube content is then displayed within the virtual tour. The YouTube content may be updated by the owner of the virtual tour without having to incur the expense of having the entity who created the virtual tour update that content. Similarly, a user may view a virtual tour with a hotspot that when invoked requests through a hyperlink and specific access code Twitter feeds from the Twitter server (102). Such Twitter content is then displayed within the virtual tour. The Twitter content may be updated by the owner of the virtual tour without having to incur the expense of having the entity who created the virtual tour update that content.

The arrangement of servers and other devices making up the exemplary system illustrated in FIG. 2 are for explanation, not for limitation. Data processing systems useful according to various embodiments of the present invention may include additional servers, routers, other devices, and peer-to-peer architectures, not shown in FIG. 2, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 2.

Content management for virtual tours in accordance with the present invention is generally implemented with computers, that is, with automated computing machinery. For further explanation, therefore, FIG. 3 sets forth a block diagram of automated computing machinery comprising an exemplary virtual tour server (108) useful in content management for virtual tours according to embodiments of the present invention. The virtual tour server (108) of FIG. 3 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a virtual tour application (126), a module of computer program instructions for serving up virtual tours (202) Also stored in RAM (168) is an operating system (154). Operating systems useful content management for virtual tours according to embodiments of the present invention include UNIX™, Linux™, Microsoft XP™, AIX™, IBM's i5/OS™, and others as will occur to those of skill in the art. The operating system (154), virtual tour application (126), and the virtual tours (202) in the example of FIG. 3 are shown in RAM (168), but many components of such software typically are stored in non-volatile memory also, such as, for example, on a disk drive (170).

Figure 3:
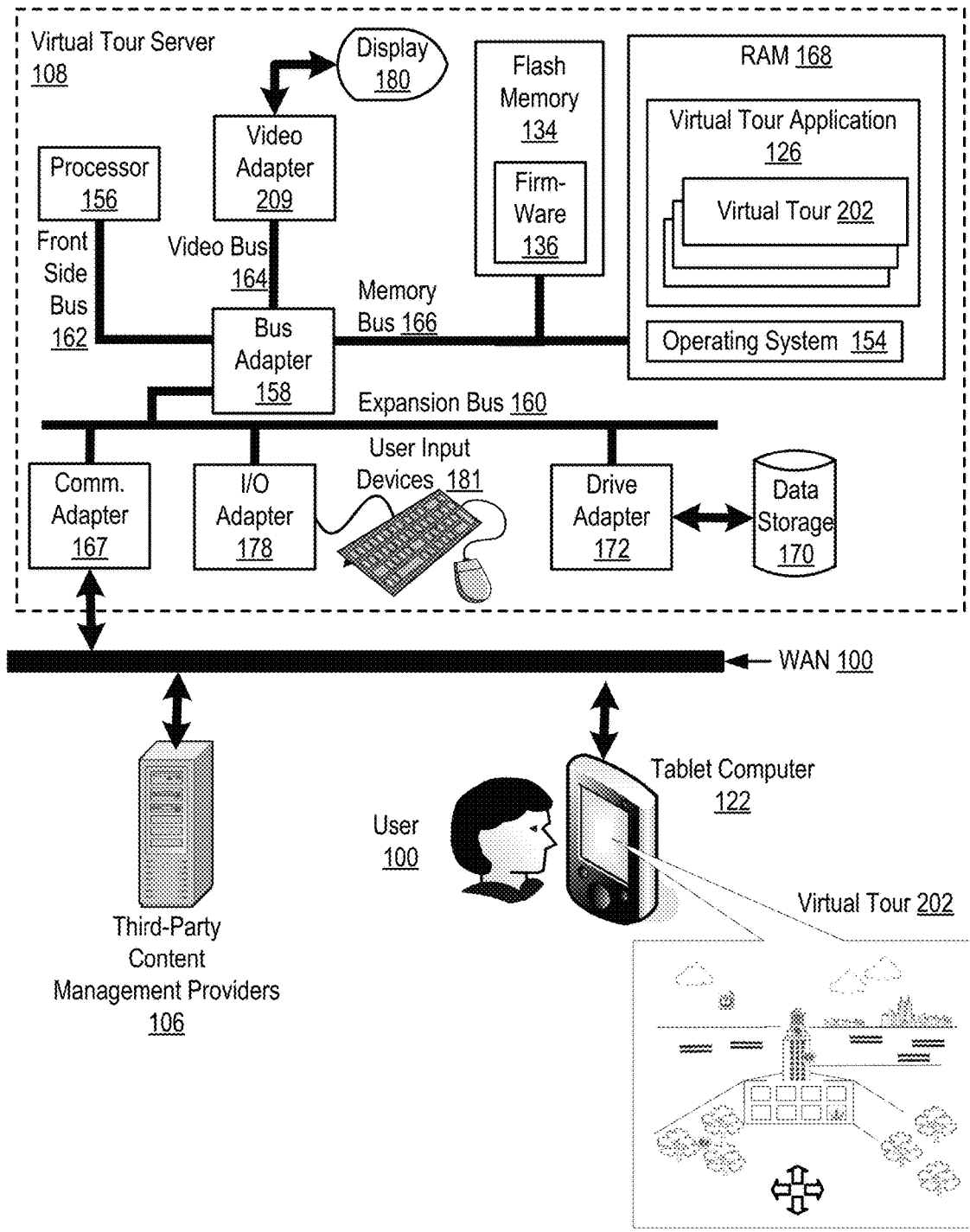
FIG. 3 sets forth a block diagram of automated computing machinery including an exemplary virtual tour server useful in content management for virtual tours according to embodiments of the present invention.

The virtual tour server (108) of FIG. 3 includes disk drive adapter (172) coupled through expansion bus (160) and bus adapter (158) to processor (156) and other components of virtual tour server (108). Disk drive adapter (172) connects non-volatile data storage to the virtual tour server (108) in the form of disk drive (170). Disk drive adapters useful in virtual tour servers (108) according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example virtual tour server (108) of FIG. 3 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example virtual tour server (108) of FIG. 3 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The virtual tour server (108) of FIG. 3 includes a communications adapter (167) for data communications with other computers such as the tablet computer (122) and third party content management providers (106) for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for [preamble] according to embodiments of the present invention include modems for wired dial-up communications, Ethernet (IEEE 802.3) adapters for wired data communications network communications, and 802.11 adapters for wireless data communications network communications.

In the example of FIG. 3, the virtual tour server (108) provides a virtual tour (2020 to be viewed by a user (100) on a client tablet computer (122) and virtual tour exposes a hotspot. The hotspot so exposed has an associated a hyperlink to a third-party content management provider (106) and access code for accessing content from third-party content management provider.

The user (100) viewing the virtual tour on the client device (122) in the example of FIG. 3 may invoke the hotpot which in turns invokes the hyperlink associated with the hotspot and invokes the access code for accessing content from third-party content management provider (106). In the system of FIG. 3 the content associated with the hotspot is received directly from the third-party content management provider (106) and displayed within the virtual tour.

Figure 4:
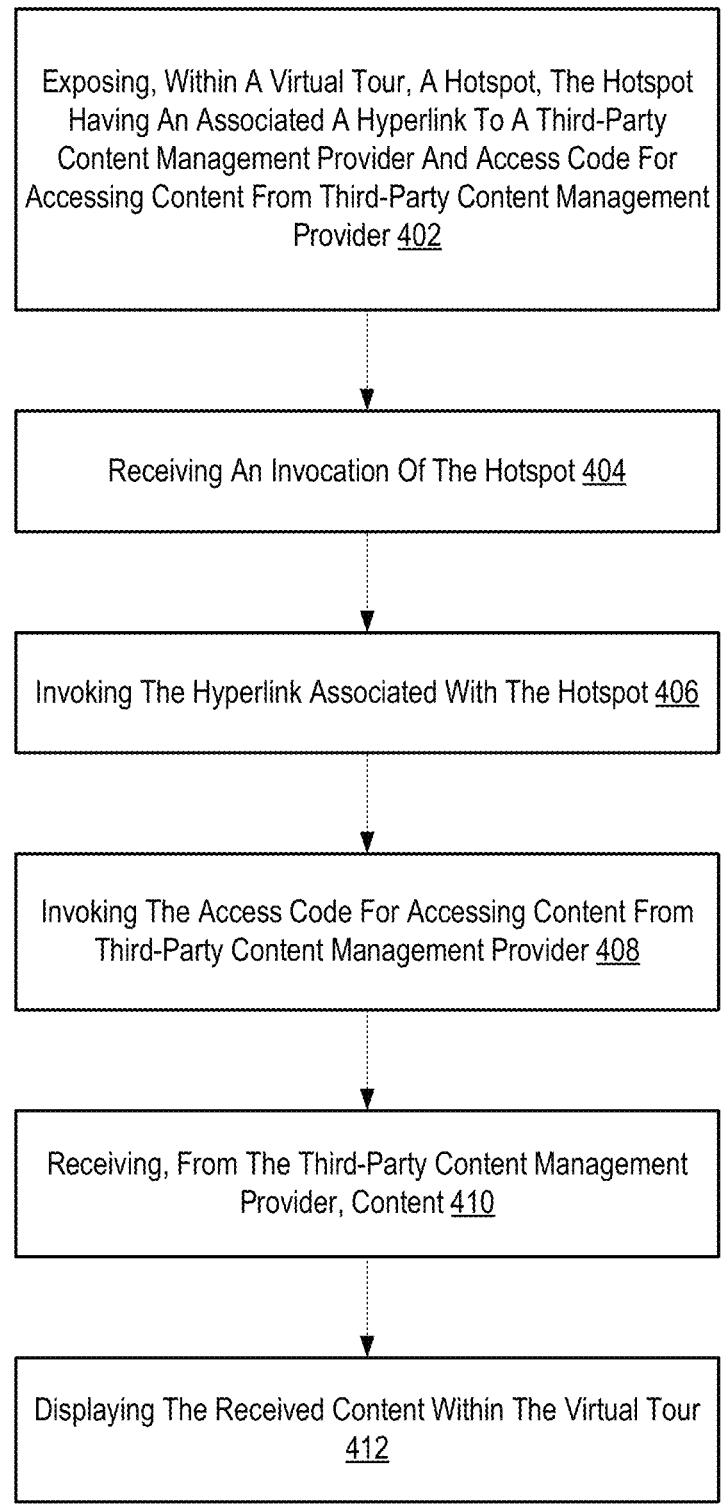
FIG. 4 sets forth a flow chart illustrating an example method for content management for virtual tours according to embodiments of the present invention.

For further explanation, FIG. 4 sets forth a flow chart illustrating an example method for content management for virtual tours according to embodiments of the present invention. In many embodiments of the present invention, the virtual tour includes a plurality of images stitched together to create a 360° image of a location.

The method of FIG. 4 includes exposing (402), within a virtual tour, a hotspot, the hotspot having an associated a hyperlink to a third-party content management provider and access code for accessing content from third-party content management provider. In typical embodiments of the present invention, the hotspot is 'in-context', that is, the location of the hotspot in the virtual tour indicates a relationship between one or more visual elements of the virtual tour and the content received from the third-party content management provider for display in the virtual tour.

As described above, a third-party content management provider is a publicly available content management operator, typically, operating through a publicly available website. Examples of third party content management providers include YouTube.com, Twitter.com, Flickr.com, Facebook.com, and others as will occur to those of skill in the art. In some embodiments of the present invention, the third-party content management provider includes a social media or social networking website, while in other embodiments, the third-party content management provider provides content in a manner that is not typically associated with social media or social networking.

In many embodiments of the present invention, the virtual tour owner has an account with the content management provider and provides through the content management provider content related to the hotspot. In this manner, the virtual tour owner is empowered to update content associated with a hotspot without having to incur the cost of having the entity that created the virtual tour to update the content associated with the hotspot.

In some embodiments of the present invention, access code for accessing content from third-party content management provider includes an application programming interface ('API') call to the third-party content management provider. Such APIs may be calls to authenticate a user account, to search user activity or comments, identify content, identify blogs and other API calls that will occur to those of skill in the art.

In other embodiments of the present invention, access code for accessing content from third-party content management provider includes a widget provided by the third-party content management provider. Such widgets may in some embodiments operate as plug-ins that authenticate user accounts, search user activity or comments, identify content, identify blogs and other operations that will occur to those of skill in the art.

In other embodiments of the present invention, access code for accessing content from third-party content management provider further comprises HyperText Markup Language ('HTML') elements provided by the third-party content management provider. Such HTML elements may in some embodiments operate to authenticate user accounts, search user activity or comments, identify content, identify blogs, and other operations that will occur to those of skill in the art.

The method of FIG. 4 also includes receiving (404) an invocation of the hotspot. Receiving (404) an invocation of the hotspot is typically carried out by detecting a user's engagement with a GUI visual element on the virtual tour representing a hotspot. Detecting a user's engagement with a GUI visual element may be carried out by detecting a mouseclick, an invocation of a GUI element on a touchscreen, a keystroke or in other ways as will occur to those of skill in the art.

The method of FIG. 4 also includes invoking (406) the hyperlink associated with the hotspot. Hyperlinks are specified in HTML for example using the <a> (anchor) elements. To see the HTML used to create a page, most browsers offer a "view page source" option. Included in the HTML code will be an expression in the form symbol "<a" and the reference "href="URL">" marking the start of an anchor, followed by the highlighted text and the "</a>" symbol, which indicates the end of the source anchor. The <a> element can also be used to indicate the target of a link. Invoking (406) the hyperlink associated with the hotspot may be carried out by identifying the URL associated with an anchor element and sending an HTTP request message to the URL associated with the anchor element.

The method of FIG. 4 also includes invoking (408) the access code for accessing content from third-party content management provider. Invoking (408) the access code for accessing content from third-party content management provider may be carried out by calling APIs associated with the access code, invoking widgets associated with the access code, utilizing HTML, elements associated with the access code and in other ways as will occur to those of skill in the art.

The method of FIG. 4 also includes receiving (410), from the third-party content management provider, content. Receiving (410), from the third-party content management provider, content may be carried out by receiving an HTTP response message containing content to be rendered within the virtual tour. Such an HTTP response may be responsive to an HTTP request message for the content.

The method of FIG. 4 also includes displaying (412) the received content within the virtual tour. Displaying (412) the received content within the virtual tour is typically carried out by rendering the received content within the virtual tour either through the use of a web browser or a special purpose application. Displaying (412) the received content within the virtual tour may also include displaying the content without the associated skin of the third-party content provider. That is, content from YouTube.com may be displayed without the typical YouTube skin often displayed with content coming directly from YouTube.com.

Exemplary embodiments of the present invention are described largely in the context of a fully functional computer system for content management for virtual tours. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of content management for virtual tours, the method comprising:
providing first data for displaying both a rotatable panoramic image and a clickable graphical user interface (GUI) object embedded within the rotatable panoramic image in association with a point of interest corresponding to a visual element of the rotatable panoramic image, the GUI object associated with a hyperlink to a third-party content management provider and code for accessing media content from the third-party content management provider;
receiving an invocation of the GUI object;
invoking the hyperlink and the code for accessing the media content associated with the GUI object, wherein invoking the hyperlink includes identifying a uniform resource locator (URL) and sending a request to the URL, and wherein invoking the code includes executing elements included in the code identifying the media content; and in response to the invocation of the hyperlink and the code for accessing the media content:

receiving the media content related to the point of interest corresponding to the visual element of the rotatable panoramic image from the third-party content management provider; and providing second data for displaying, within a frame embedded within the rotatable panoramic image, the media content received from the third-party content management provider and related to the point of interest corresponding to the visual element of the rotatable panoramic image, wherein a location of the GUI object in the rotatable panoramic image indicates a relationship between one or more visual elements of the rotatable panoramic image and the media content received from the third-party content management provider in response to the invocation of the hyperlink and the code for accessing the media content for display in the rotatable panoramic image.

2. The method of claim 1, wherein the media content includes one or more messages from a social media messaging feed.

3. The method of claim 1, further comprising retrieving the rotatable panoramic image from a source other than the third-party content management provider.

4. The method of claim 1, wherein a virtual tour owner has an account with the third-party content management provider and provides through the third-party content management provider the media content related to the GUI object.

5. The method of claim 1, wherein invoking the code for accessing the media content from the third-party content management provider includes at least one of:
issuing an application programming interface (API) call to the third-party content management provider;
invoking a widget; or
using HyperText Markup Language (HTML) elements included in the code.

6. The method of claim 1, wherein invoking the code for accessing the media content from the third-party content management provider further includes at least one of:
authenticating a user;
searching for content; or
searching user activity.

7. The method of claim 1, wherein the second data for displaying, within the frame embedded within the rotatable panoramic image, the media content received from the third-party content management provider includes information for rendering the media content without a skin associated with the third-party content management provider.

8. A system comprising:
a computer processor; and
a memory operatively coupled to the computer processor, wherein the computer processor is configured to:
provide first data for displaying both a rotatable panoramic image and a clickable graphical user interface (GUI) object embedded within the rotatable panoramic image in association with a point of interest corresponding to a visual element of the rotatable panoramic image, the GUI object associated with a hyperlink to a third-party content management provider and code for accessing media content from the third-party content management provider;

receive an invocation of the GUI object;

invoke the hyperlink and the code for accessing the media content associated with the GUI object, wherein invoking the hyperlink includes identifying a uniform resource locator (URL) and sending a request to the URL, and wherein invoking the code includes executing elements included in the code identifying the media content; and in response to the invocation of the hyperlink and the code for accessing the media content:

receive the media content related to the point of interest corresponding to the visual element of the rotatable panoramic image from the third-party content management provider; and provide second data for displaying, within a frame embedded within the rotatable panoramic image, the media content received from the third-party content management provider and related to the point of interest corresponding to the visual element of the rotatable panoramic image, wherein a location of the GUI object in the rotatable panoramic image indicates a relationship between one or more visual elements of the rotatable panoramic image and the media content received from the third-party content management provider in response to the invocation of the hyperlink and the code for accessing the media content for display in the rotatable panoramic image.

9. The system of claim 8, wherein the third-party content management provider comprises a social media website.

10. The system of claim 8, wherein a virtual tour owner has an account with the third-party content management provider and provides through the third-party content management provider the media content related to the GUI object.

11. The system of claim 8, wherein, to invoke the code for accessing the media content from the third-party content management provider, the computer processor is further configured to perform at least one of:
issue an application programming interface (API) call to the third-party content management provider;
invoke a widget; or
use HyperText Markup Language (HTML) elements included in the code.

12. The system of claim 8, wherein, to invoke the code for accessing the media content from the third-party content management provider, the computer processor is further configured to perform at least one of:
authenticate a user;
search for content; or
search user activity.

13. The system of claim 8, wherein the second data for displaying, within the frame embedded within the rotatable panoramic image, the media content received from the third-party content management provider includes information for rendering the media content without a skin associated with the third-party content management provider.

14. A computer program product disposed upon a non-transitory computer readable storage medium, the computer program product comprising computer program instructions that, when executed, cause a computer to:
provide first data for displaying both a rotatable panoramic image and a clickable graphical user interface (GUI) object embedded within the rotatable panoramic image in association with a point of interest corresponding to a visual element of the rotatable panoramic image, the GUI object associated with a hyperlink to a third-party content management provider and code for accessing media content from the third-party content management provider;

receive an invocation of the GUI object;

invoke the hyperlink and the code for accessing the media content associated with the GUI object, wherein invoking the hyperlink includes identifying a uniform resource locator (URL) and sending a request to the URL, and wherein invoking the code includes executing elements included in the code identifying the media content; and in response to the invocation of the hyperlink and the code for accessing the media content:

receive the media content related to the point of interest corresponding to the visual element of the rotatable panoramic image from the third-party content management provider; and provide second data for displaying, within a frame embedded within the rotatable panoramic image, the media content received from the third-party content management provider and related to the point of interest corresponding to the visual element of the rotatable panoramic image, wherein a location of the GUI object in the rotatable panoramic image indicates a relationship between one or more visual elements of the rotatable panoramic image and the media content received from the third-party content management provider in response to the invocation of the hyperlink and the code for accessing the media content for display in the rotatable panoramic image.

15. The computer program product of claim 14 wherein the third-party content management provider comprises a social media website.

16. The computer program product of claim 14 wherein a virtual tour owner has an account with the third-party content management provider and provides through the third-party content management provider the media content related to the GUI object.

17. The computer program product of claim 14, further comprising computer program instructions, that, when executed, to invoke the code for accessing the media content from the third-party content management provider, cause the computer to perform at least one of:

issue an application programming interface (API) call to the third-party content management provider;

invoke a widget; or use HyperText Markup Language (HTML) elements included in the code.

18. The computer program product of claim 14, further comprising computer program instructions, that, when executed, to invoke the code for accessing the media content from the third-party content management provider, further cause the computer to perform at least one of:

authenticate a user;

search for content; or search user activity.

19. The computer program product of claim 14, wherein the second data for displaying, within the frame embedded within the rotatable panoramic image, the media content received from the third-party content management provider includes information for rendering the media content without a skin associated with the third-party content management provider.

* * * * *